United States Patent [19]

Kamatani et al.

[11] 4,443,590
[45] Apr. 17, 1984

[54] COMPOSITION FOR POLYURETHANE RESINS AND PRODUCTION OF THE SAME

[75] Inventors: Yoshio Kamatani, Osaka; Michio Tanaka, Shizuoka; Kyuya Yamazaki, Osaka, all of Japan

[73] Assignee: Takeda Chemical Industries, Ltd., Osaka, Japan

[21] Appl. No.: 454,490

[22] Filed: Dec. 29, 1982

Related U.S. Application Data

[63] Continuation-in-part of Ser. No. 390,883, Jun. 22, 1982, abandoned.

[30] Foreign Application Priority Data

Jul. 1, 1981 [JP] Japan ................................. 56-103697
Dec. 23, 1981 [JP] Japan ................................. 56-208433

[51] Int. Cl.³ ..................... C08G 18/78; C08G 18/16; C08G 18/18; C08G 18/22
[52] U.S. Cl. ........................................ 528/51; 521/902; 528/52; 528/53; 528/57; 528/73; 528/74.5
[58] Field of Search ....................... 528/52, 73, 51, 53, 528/73.5, 57; 521/902

[56] References Cited

U.S. PATENT DOCUMENTS

| | | | |
|---|---|---|---|
| 3,799,898 | 3/1974 | Lamplugh et al. | 260/2.5 AD |
| 3,810,851 | 5/1974 | Norman et al. | 260/2.5 AJ |
| 4,046,721 | 9/1977 | Austin et al. | 521/902 |

OTHER PUBLICATIONS

Japanese Examined Patent Publication No. 3000/1974, Takeda Chem. Ind. Application No. 124073/1970, Dec. 28, 1970 (English Translation).

*Primary Examiner*—H. S. Cockeram
*Attorney, Agent, or Firm*—Antonelli, Terry & Wands

[57] ABSTRACT

Disclosed is a polyurethane composition of multi-pack type, curable at ambient temperature, which comprises an isocyanate component having oxadiazinetrione ring, an active hydrogen component and a Lewis base whose basic site has no hydrogen active to NCO group and a process for producing polyurethane from the composition.

The composition has excellent curability at ambient temperature and is useful for coatings, adhesives and elastomers as high solid content type or solventless type. The cured product polyurethane has good mechanical properties.

45 Claims, No Drawings

COMPOSITION FOR POLYURETHANE RESINS AND PRODUCTION OF THE SAME

RELATED APPLICATION

This application is a continuation-in-part of application Ser. No. 390,883 filed on June 22, 1982, now abandoned.

BACKGROUND OF THE INVENTION

This invention relates to a novel composition for polyurethane resins and the production of the resins. More particularly, it relates to a multi-pack type composition for polyurethane resins and for ambient temperature curing which comprises an isocyanate component having oxadiazinetrione ring, an active hydrogen component and a Lewis base whose basic site has no hydrogen active to NCO group, and to a process for preparing polyurethane resins from said composition.

Hitherto, polyurethane resins have been used as, for example, coatings, adhesives and elastomers for various substrates such as woods, metals, roofing tiles, concretes, plastics, rubbers, papers floor covering materials, water-proof materials, sealing materials, etc., because they are superior to other synthetic resins in chemical resistance, mechanical properties, stain resistance, adhesiveness, gloss, wear resistance, weathering resistance, etc.

As compositions for the polyurethane resins, one-pack type and multi-pack type such as two-pack type are known. The two-pack type compositions usually comprise an active hydrogen component which is a main component and a polyfunctional polyisocyanate component which is a curing agent. As this curing agent, commonly used are derivatives such as polyisocyanates having urethane, urea or biuret bond obtained by reaction of a diisocyanate as a starting material with a polyol, water, an amine, etc. and polyisocyanates having isocyanurate ring obtained by trimerization of a diisocyanate using catalysts. However, isocyanate content of such derivatives is much lower than that of the starting diisocyanate. Therefore, a considerably larger amount of curing agent is needed than that of the active hydrogen compound, a main component. However, a curing agent is expensive as compared with the main component and such curing agents as capable of curing even in a small amount have been desired. Furthermore, said derivatives are of high viscosity and sometimes they must be diluted with solvents when they are used as a curing agent. Thus, high solid content type or solventless type curing agents have been demanded from point of saving resources and prevention of environmental pollution. Furthermore, urethane resin compositions curable at ambient temperature generally require a long time for complete curing and hence are inferior in workability.

This invention provides useful solventless type polyurethane resin compositions as well as solvent type polyurethane resin compositions. Recently, various coatings, adhesives and elastomer compositions containing no solvent have been proposed. However, these are inferior to solvent type compositions in workability, drying speed, mechanical properties, adhesiveness, etc. Solvent type compositions can be provided with a suitable viscosity by adjusting an amount of solvent added thereto. However, in the case of solventless type compositions, the use of main component of low molecular weight is necessarily demanded for reducing viscosity. Hence, the compositions require a long time for drying and curing, and the resulting cured products also have unsatisfactory properties. The composition of this invention, even in the case of solventless type, is excellent in operability and curable for a short period of time, and the resulting cured products have excellent mechanical properties.

The present inventors have found that the reaction for producing allophanates from oxadiazinetrione ring and active hydrogen compounds readily proceeds even at ambient temperature in the presence of a Lewis base whose basic site has no hydrogen active to NCO group. They have made intensive researches to apply this knowledge to curing of urethane compositions. As a result, it has been found that when an isocyanate component having oxadiazinetrione ring, as a curing agent, is reacted with an active hydrogen component in the presence of a Lewis base whose basic site has no hydrogen active to NCO group in order to prepare coatings, adhesives, elastomers, etc., the amount of the curing agent to be used may be small, the agent can be used as high solid content type or solventless type compositions, and furthermore curability thereof is superior to that of the conventional urethane curing agents. Thus, according to the present invention, the above mentioned problems can be completely solved.

SUMMARY OF THE INVENTION

This invention relates to a polyurethane composition of multi-pack type, curable at ambient temperature which comprises an isocyanate component having oxadiazinetrione ring, an active hydrogen component and a Lewis base whose basic site has no hydrogen active to NCO group, and to a process for producing polyurethane resins which comprises reacting an isocyanate component having oxadiazinetrione ring with an active hydrogen component at ambient temperature in the presence of a Lewis base whose basic site has no hydrogen active to NCO group.

DESCRIPTION OF THE INVENTION

The isocyanate component having oxadiazinetrione ring means a compound having oxadiazinetrione ring and isocyanate group together in a molecule. Such compound can be obtained by the reaction of an isocyanate with carbon dioxide by conventional manners per se. As examples of the isocyanate, mention may be made of aliphatic, alicyclic and aromatic-aliphatic polyisocyanates such as tetramethylene diisocyanate, hexamethylene diisocyanate, $\omega,\omega'$-diisocyanatodipropyl ether, 2,6-diisocyanatocaproic acid ester, 1,6,11-triisocyanatoundecane, bis(isocyanatomethyl)cyclohexane, bis(isocyanatoethyl)cyclohexane, 1-isocyanato-3-isocyanatomethyl-3,5,5-trimethylcyclohexane, bis(4-isocyanatocyclohexyl)methane, xylylene diisocyanate, bis(2-isocyanatoethyl)benzene, etc. These polyisocyanates may be used alone or as a mixture thereof. Furthermore, these polyisocyanates may be used as mixtures with monoisocyanates such as methyl isocyanate, ethyl isocyanate, n-butyl isocyanate, $\omega$-chlorohexyl isocyanate, cyclohexyl isocyanate, cyclohexylmethyl isocyanate, benzyl isocyanate, phenylethyl isocyanate, etc.

The reaction of the isocyanate with carbon dioxide is effected in the presence of a catalyst. As the catalyst, tertiary phosphines, arsenic compounds, hydroquinones may be used and the tertiary phosphines are particularly effective. The reaction product may be used as it is or after unreacted isocyanates have been removed therefrom, as the isocyanate component having oxadiazinetrione ring of this invention. Ordinarily, it is preferred to add various compounds to terminate the reaction and stably store the products. As such reaction terminators and stabilizers, alkylating agents, acylating agents, acids, ester derivatives, phenols, peroxides, sulfur, polysulfides, metal sulfides, halogens, etc. may be used. Especially, the isocyanate components having oxadiazinetrione ring to which an additive selected from peroxides, sulfur, polysulfides, metal sulfides and halogens is added are preferred as a curing agent because the reaction of oxadiazinetrione ring and isocyanate with hydroxyl group of active hydrogen component proceeds smoothly.

In the preparation of the isocyanate components having oxadiazinetrione ring from polyisocyanates and carbon dioxide, adducts having terminal NCO group may also be used as the polyisocyanates. Such adducts can be obtained by reacting polyisocyanates with polyol compounds (e.g., ethylene glycol, propylene glycol, 1,4-butanediol, neopentyl glycol, hexylene glycol, diethylene glycol, dipropylene glycol, triethylene glycol, glycerine, trimethylolpropane, polyether polyol, polyester polyol, acrylic polyol, epoxypolyol, etc.) or polyamine compounds (e.g., ethylenediamine, hexamethylenediamine, phenylenediamine, polyether polyamine, polyamide polyamine, etc.) in an excess ratio of NCO group to active hydrogen of the polyol or polyamine compounds. Polyisocyanates, NCO of which is partially blocked with a blocking agent and those having partially dimerized or trimerized NCO groups may also be used as the polyisocyanates.

Furthermore, there may also be used as the isocyanate component adducts, blocked derivatives and polymerized derivatives of the isocyanate having oxadiazinetrione ring obtained by reaction of polyisocyanates with carbon dioxide. The addition reaction, blocking reaction or polymerization reaction may be carried out simultaneously with the reaction of preparing the oxadiazinetrione ring. Furthermore, it is also possible to use mixtures of the isocyanates having oxadiazinetrione ring with said adducts, blocked derivatives or polymerized derivatives which have been respectively prepared.

Of the isocyanate components having oxadiazinetrione ring as mentioned above, those which are derived from hexamethylene diisocyanate, 1-isocyanate-3-isocyanatomethyl-3,5,5-trimethylcyclohexane and bis-(isocyanatomethyl)cyclohexane provide compositions especially excellent in curability and other properties.

The isocyanate component having oxadiazinetrione ring employable in this invention is the one having an average functionality of 2 to 10, preferably of 3 to 5, which is the sum of oxadiazinetrione ring and isocyanate group in one molecule. The functionality of the isocyanate component to be used was determined depending on the functionality, OH value and molecular weight of the active hydrogen component, properties of the objective resins, molecular structure of the isocyanate component, etc.

When the isocyanate components having oxadiazinetrione ring contain unreacted isocyanate monomers, low functional substances, etc. and, therefore, are unsuitable to use as they are, it is also possible to remove the monomers, low functional substances, etc. by appropriate methods such as distillation, extraction, crystallization, etc. Thus obtained isocyanate components having oxadiazinetrione ring can be used as a curing agent. Of course, if necessary, these isocyanate components may be used in such forms as suitable for use by diluting them with organic solvents, thinners, etc.

As the active hydrogen components employable in this invention, mention may be made of a compound containing at least two active hydrogens and having a molecular weight of 400 to 100,000, preferably 400 to 50,000. More preferred is a polyol containing 2 to 50 of hydroxyl groups in one molecule and having a molecular weight of 400 to 50,000, preferably 500 to 30,000. The compound may be the one having active hydrogen such as carboxyl group, amino group, thiol group, etc. in addition to hydroxyl groups. When the compound containing active hydrogens has a molecular weight of less than 400, there cannot be obtained the cured products having good physical properties.

Specifically, there may be suitably used polyester polyols, polyether polyols, polyether-ester polyols, polyester-amide polyols, acrylic polyols, polyurethane polyols, epoxy polyols, epoxy-modified polyols, polyhydroxyalkanes, oil-modified polyols, caster oil or mixtures thereof.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimetanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic, sebacic acid, phthalic acid, isophthalic acid, terephthalic acid, tetrahydrophthalic acid, hexahydrophthalic acid, maleic acid, fumaric acid and anhydrides thereof, etc. Further suitable examples are those polyester polyols which are obtained by ring opening polymerization of lactones such as caprolactone, methylcaprolactone, etc. with glycols, etc.

Examples of polyether polyols are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture or alternately to reactive hydrogen atom containing initiators. As the reactive hydrogen atom containing initiators, mention may be made of water, polyols such as ethylene glycol, propylene glycol, glycerol, trimethylolpropane, pentaerythritol, sorbitol, etc., amino alcohols such as ethanolamine, polyamines such as ethylenediamine, etc.

As examples of the polyether ester polyols, mention may be made of those which are obtained by subjecting said polyether polyols and polybasic acids to polyesterification reaction and besides, those which have both the segments of polyether and polyester in one molecule and which are obtained by ring-opening copolymerization of epoxide compounds and acid anhydrides.

Examples of the polyester amide polyols are those which are obtained by said polyesterification reaction where amino group containing starting materials such as ethylenediamine, propylenediamine, hexamethylenediamine, xylylenediamine, hydrogenated xylylenediamine, ethanolamine, propanolamine are additionally used.

Hydroxyl group containing polymers generally called acrylic polyols can be prepared by copolymerizing polymerizable monomers containing at least one hydroxyl group in one molecule and other monomers copolymerizable with said monomers. As examples of the hydroxyl group containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleates and fumarates, etc. As examples of the copolymerizable monomers, mention may be made of vinyl monomers such as acrylic acid, its methyl, ethyl, propyl, butyl and 2-ethylhexyl esters, methacrylic acid, maleic acid, fumaric acid, itaconic acid and their esters as referred to for acrylic acid, styrene, α-methylstyrene, vinyl acetate, acrylonitrile, methacrylonitrile, etc. The acrylic polyols can preferably be used for coating purpose.

As examples of polyurethane polyols, mention may be made of reaction products of polyols and polyisocyanates which have terminal hydroxyl groups. As examples of the polyols, mention may be made of polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. and polymer polyols such as polyester polyols, polyether polyols, polyester ether polyols, polyester amide polyols, etc. As examples of the polyisocyanates, mention may be made of tetramethylene diisocyanate, hexamethylene diisocyanate, 2,6-diisocyanatomethylcaproate, 3-isocyanatomethyl-3,5,5-trimethylcyclohexyl isocyanate, 4,4'-methyleneo bis(cyclohexylisocyanate), 1,3- or 1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of these polycyanates. Furthermore, products obtained by the reaction of said polyisocyanate with said polyol a part of which is substituted with an amino compound such as ethylenediamine, propylenediamine, hexamethylenediamine, xylyldenediamine, bisaminomethylcyclohexane, 3-aminomethyl-3,5,5-trimethylcyclohexylamine, ethanolamine, propanolamine, etc. may also be used as the polyurethane polyols. The polyurethane polyols can preferably be used for adhesion purpose.

Examples of the epoxypolyols are epoxy resins obtained by the condensation reaction of a polyphenol compound or its ring hydrogenated product with epichlorohydrin. In addition to these resins, there may be also used, for example, epoxy ester resins obtained by the reaction of a fatty acid with an epoxy resins or modified epoxy resins obtained by the reaction of an alkanolamine with an epoxy resin.

Examples of the polyhydroxyalkanes are hydrolyzed products of vinyl acetate homopolymers or copolymers of vinyl acetate with other ethylenic copolymerizable monomers and polybutadiene polyols.

When the compositions of this invention are used as solventless type resin compositions, a compound having a functionality of 2 to 6, preferably 2 to 4 and an average molecular weight of not more than 10,000, preferably 400 to 5,000 is preferably usable as the polyol component, (main component).

Low molecular weight polyols and polyamines having a molecular weight of less than 400 may be optionally used with the above high molecular weight polyol in order to vary the properties of cured products.

The proportion of the isocyanate component having oxadiazinetrione ring to the active hydrogen component is preferably such that the ratio of the total number of isocyanate group and oxadiazinetrione ring to the number of active hydrogen in the active hydrogen component is generally in a range of 0.1 to 10, more preferably 0.5 to 3. When the compositions are used as coating materials, said ratio is generally in a range of 0.4 to 2, preferably 0.6 to 1.4.

The third component of the present invention is a Lewis base whose basic site has no hydrogen active to NCO group. Examples of the said Lewis base include (a) a tertiary amine, (b) a tertiary phosphine and (c) a weak acid salt, hydroxide or alcoholate of a quaternary ammonium, an alkali metal or an alkaline earch metal. The Lewis base acts as a catalyst for reaction of oxadiazinetrione ring and active hydrogen component. The amount of the Lewis base to be added may be optionally chosen depending on kinds of the main component and curing agent, curing conditions, etc. The amount of the Lewis base is generally in a range of about 0.001 to 10% by weight, especially preferably about 0.003 to 5% by weight based on the weight of non-volatile matter in the main component and the curing agent. The reaction effectively proceeds within these ranges.

The tertiary amine used in this invention includes an aromatic and aliphatic tertiary amine, the latter being preferred. The aliphatic tertiary amine includes chain and cyclic amines. Their monoamines, polyamines such as diamines, triamines, etc. may be used. Preferable of these aliphatic amines are azabicycloalkenes, aliphatic polyamines, alycyclic monoamines, partially cyclic polyamines, etc. These aliphatic amines include those represented by the following formula:

[wherein R and R' represent alkylene of 2 to 6 carbon atoms],

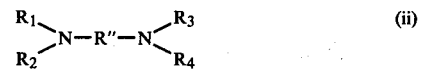

[wherein $R_1$-$R_4$ each represents an alkyl having 1 to 6 carbon atoms and R" represents an alkylene having 1 to 8 carbon atoms or —R'"—$NR_5$—R'"— (wherein R'" represents an alkylene having 1 to 8 carbon atoms and $R_5$ is the same as $R_1$-$R_4$), and $R_1$ and $R_2$ or $R_3$ and $R_4$ when taken together may form an alkylene having 1 to 8 carbon atoms, —R''''—O—R''''— (R'''' is the same as defined before) or —R''''—$NR_6$—R''''— (R'''' is the same as defined before and $R_6$ is the same as $R_1$-$R_4$)],

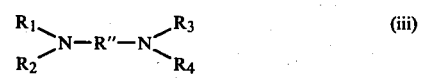

[wherein $R_1$-$R_4$ each represents an alkyl having 1 to 6 carbon atoms and R" represents an alkylene having 1 to 8 carbon atoms or —R'"—$NR_5$—R'"— (wherein R'"

represents an alkylene having 1 to 8 carbon atoms and R₅ is the same as R₁-R₄), and R₁ and R₂ or R₃ and R₄, when taken together, may form an alkylene having 1 to 8 carbon atoms, —R'''—O—R'''— (R''' is the same as defined before) or —R'''—NR₆—R'''— (R''' is the same as defined before and R₆ is the same as R₁-R₄), at least one of R₁-R₆ being substituted by hydroxyl or an alkoxy having 1 to 6 carbon atoms],

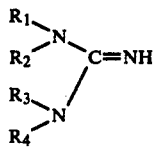

(iv)

[wherein R₁-R₄ each represents an alkyl having 1 to 6 carbon atoms which may be substituted with hydroxyl or an alkoxy having 1 to 6 carbon atoms, and R₁ and R₂ or R₃ and R₄, when taken together, may form an alkylene having 1 to 8 carbon atoms],

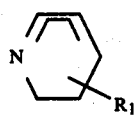

(v)

[wherein R₁ represents an alkyl having 1 to 6 carbon atoms which may be substituted with hydroxyl or alkoxy having 1 to 6 carbon atoms],

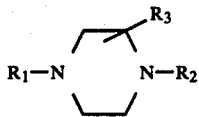

(vi)

[wherein R₁, R₂ and R₃ each represents an alkyl having 1 to 6 carbon atoms which may be substituted with hydroxyl or alkoxy having 1 to 6 carbon atoms], or

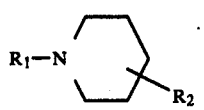

(vii)

[wherein R₁ and R₂ each represents an alkyl having 1 to 6 carbon atoms which may be substituted with hydroxyl or alkoxy having 1 to 6 carbon atoms].

Especially preferred amines are, for example, azabicycloalkenes such as 1,5-diazabicyclo[5,4,0]-5-undecene, 1,5-diazabicyclo[4,3,0]-5-nonene, etc., aliphatic and partially alicyclic polyamines such as N,N,N',N'-tetramethylethylenediamine, N,N,N',N'-tetramethyl-1,6-hexanediamine, N,N-bis(2-dimethylaminoethyl)methylamine, N-(2-dimethylaminoethyl)morpholine, N-methyl-N'-(2-dimethylaminoethyl)-piperazine, N,N,N'-trimethyl-N'-(2-hydroxyethyl)ethylenediamine, bis(2-dimethylaminoethoxy)methane, tetramethylguanidine, etc., cyclic monoamines such as quinuclidine, N,N'-dialkylpiperazine, N-alkylpiperazine and alkylated derivatives thereof. Furthermore, addition product of 1,2-epoxy alkane and aliphatic amines may also be used as tertiary amines.

Salts or organic acids, amino acids and inorganic acids with said tertiary amines may also be effectively used.

When these aliphatic amines, especially the above amines (i), (iii), (iv) and (v) are used as catalyst, the mixture of each component has excellent curability at ambient temperature, while it has relatively long pot life, and furthermore allophanate formation predominantly occurs, and the cured product exhibits especially excellent weathering resistance, gloss, water resistance and adhesiveness.

The tertiary phosphine used in this invention includes an aromatic and aliphatic tertiary phosphine. The aromatic substituent is a phenyl and the aliphatic substituent is the one having 1 to 10 carbon atoms. Examples are triethylphosphine, tri-n-butylphosphine, dimethylphenylphosphine, triphenylphosphine, diethylcyclohexylphosphine, 1-ethylphospholane, 1-n-butylphosphane, 1,4-diphosphabicyclo[2,2,2]octane, tris(hydroxyethyl)phosphine, etc.

As the weak acid salt of quaternary ammonium, mention may be made of a salt of ammonium having aliphatic or aromatic substituents with an acid having a pKa of more than 3 in water. The aliphatic and aromatic substituents are the same as defined above. Examples of such weak acids are carboxylic acids such as acetic acid, 2-ethylhexanoic acid, benzoic acid, naphthenic acid, lactic acid, etc., phenols such as phenol, cresol, hydroquinone, etc., imidazoles such as imidazole, benzimidazole, etc., imides such as succinimide, phthalimide, etc., barbituric acid, isocyanuric acid, uracil, cyanic acid, xanthogenic acid, boric acid, silicic acid, etc. Typical examples of such salts are tetramethylammonium acetate and trimethyl(2-hydroxyisopropyl)ammonium formate. As examples of the hydroxide of quaternary ammonium, mention may be made of a quaternary ammonium hydroxide having aliphatic or aromatic substituent such as tetramethylammonium hydroxide, benzyltrimethylammonium hydroxide, etc. The aliphatic and aromatic substituents are the same as defined above.

The weak acid salt of an alkali metal or an alkaline earth metal includes an alkali metal salt or an alkaline earch metal salt of the weak acid as mentioned above. Examples are sodium propionate, potassium 2-ethylhexanoate, calcium naphthenate, sodium phenolate, potassium phthalimide, etc. As hydroxides and alcoholates of alkali metals and alkaline earth metals, mention may be made of hydroxides and alcoholates of metals such as sodium, potassium, lithium, calcium, magnesium, etc. Examples are sodium methylate, sodium ethylate, potassium t-butylate, lithium hydroxide, sodium hydroxide, calcium hydroxide, magnesium hydroxide, etc.

For adjusting the reactivity of NCO group with active hydrogen component, it is effective to add known compounds such as organic compounds, organic acid salts, or inorganic salts of tin, lead, nickel, zinc, titanium, antimony, iron, cobalt, bismuch, uranium, cadmium, aluminum, vanadium, mercury, potassium, sodium, zirconium and other metals. Besides, if necessary, pigments, dyes, leveling agents, antifoamers, anti-sag agents, fillers, plasticizers, antioxidants, ultraviolet absorbers, etc. may be optionally used.

Thus obtained compositions of this invention are generally used as the so-called two-pack type or two-can type compositions. One pack contains an isocyanate component having oxadiazinetrione ring and another pack does an active hydrogen component. These packs constitute a kit. Their two components are mixed at the time of actual use. In this case, the Lewis base catalyst such as the tertiary amines, etc. may be mixed with the active hydrogen component in order to prevent deterioration of the isocyanate component. Alternately, the catalyst such as the tertiary amines, etc. may be previously dissolved in a solvent with or without a leveling agent, etc. and this solution may be mixed with the isocyanate component and/or the active hydrogen component at the time of actual use. That is the compositions are used as the so-called three-pack type. At the time of actual use of the compositions of the present invention, each component is mixed with each other as it is or in the form of solutions and the mixture is applied to the surface to be coated or adhered or injected into a mold, which cures at ambient temperature, e.g. 0° C. or 40° C. On curing at the ambient temperature, there is mainly produced an isocyanate-containing product having allophanate linkage in the molecule.

The composition of this invention is useful for coating and adhesion of woods, metals such as iron, aluminum, etc., plastics, rubbers, papers, roofing tiles, concretes, etc. Moreover, solventless type adhesive composition is useful as adhesives for producing multi-layer laminate films which are used as packaging materials for foods, etc. Solventless type coating composition is especially useful for coating at places where the use of solvent is limited such as in tanks, cellars or ships. According to this invention, an amount of the curing agent may be smaller than that of the conventional urethane curing agents, namely, about $\frac{1}{3}-\frac{3}{4}$ of the latter. Furthermore, since viscosity of the curing agent is low, the composition can be used as solventless type or high solid type coating materials, adhesives, elastomers, etc. Moreover, although the pot life after mixing the components is relatively long, the mixture shows good curability. There are some cases where the mixture may be heated in order to obtain better cured products depending on the surrounding temperatures. The obtained coatings have good appearance such as gloss, smoothness, etc. and excellent weathering resistance and elastomers are excellent in mechanical properties, weathering resistance, adhesiveness and wear resistance.

When the composition of this invention is used as a solventless type urethane adhesive composition, the conventional adhesion methods per se can be employed by properly choosing the main component and the curing agent so that the viscosity can be in a range of 100 to 10,000 centipoises, preferably 100 to 5,000 centipoises at from room temperature to 100° C. For example, the composition can be applied to the surface of substrate such as a film by a solventless type laminator.

The solventless type urethane adhesive composition of this invention has a short period of curing time and has superior adhesiveness performance as compared with the conventional solventless type urethane adhesive compositions. For example, when polyethylene terephthalate, nylon, polyethylene, polypropylene and metal foils such as aluminum foil are bonded by the adhesive composition of this invention, there are provided markedly excellent adhesive strength, heat resistance and hot water resistance. When a food packed and sealed in such films or foils is subjected to sterilization with hot water, there occurs no delamination of the film or the foil. Thus, there are provided packing materials excellent in long-term storage stability for foods.

The following examples will further illustrate this invention.

REFERENCE EXAMPLE 1

To 841 g of hexamethylene diisocyanate was added 1.8 g of tri-n-butylphosphine, while introducing carbon dioxide thereinto at 40° C. and the reaction was carried out for 6 hours while stirring. Feeding of carbon dioxide was discontinued and 0.3 g of sulfur powder was added to the reaction product. The product was stirred for 30 minutes and then cooled. Starting materials were removed therefrom with a film evaporator to obtain 255 g of a somewhat viscous liquid of pale yellow. This product had an NCO content of 4.78 meq/g, oxadiazinetrione content of 2.77 meq/g and a residual monomer content of 0.4% and had a viscosity (Gardner) of Y-Z (2,000 cps) at 25° C.

REFERENCE EXAMPLE 2

To 971 g of 1,3-bis(isocyanatomethyl)cyclohexane was added 2.1 g of tri-n-butylphosphine, while introducing carbon dioxide thereinto at 0° C. and the reaction was carried out for 7 hours while stirring. Then, carbon dioxide was replaced with nitrogen and 2.7 g of benzoyl peroxide was added to the reaction product and the product was stirred for 80 minutes. Starting materials were removed from the product by evaporation with a film evaporator to obtain 165 g of viscous liquid of pale yellow. This product had an NCO group content of 4.40 meq/g, an oxadiazinetrione content of 2.18 meq/g and a residual monomer content of 0.5% and had a viscosity of 30,000 cps at 70° C.

REFERENCE EXAMPLE 3

Using 194 g of 1,3-bis(isocyanatomethyl)cyclohexane and 2.0 g of tri-n-butylphosphine, the reaction was carried out for 8 hours in the same manner as in Reference Example 2 and the reaction was terminated by the addition of 2.6 g of benzoyl peroxide. The reaction product was dissolved in 100 ml of toluene and to the solution was added 500 ml of n-hexane. The mixture was well shaken and the solvent layer was removed. This extraction operation was repeated totally three times. To the extraction residue was added butyl acetate to obtain a solution containing 85% of nonvolatile matter. This solution had an NCO content of 2.60 meq/g and an oxadiazinetrione content of 2.27 meq/g.

EXAMPLE 1

10 g of the isocyanate component obtained in Reference Example 1 was mixed with 60.5 g of acrylic polyol Acrydic ®A-850 (OH value 70; nonvolatile matter 70%; manufactured by Dainippon Ink and Chemicals, Inc.) and then the mixture was diluted with a mixed solvent of toluene, butyl acetate and cellulose acetate. To the solution was added 60 mg of a formate of 1,5-diazabicyclo[5,4,0]-5-undecene as a 10% iso-propanol solution, followed by mixing. Then this solution was sprayed on a cold-rolled steel panel to form a coating of about 50μ thick. This panel was allowed to stand at room temperature for 7 days and the properties of the coating are shown in Table 1. As a comparative example, a mixture of 15 g of Duranate ® (biuret derivative of hexamethylene diisocyanate; amine equivalent 208; nonvolatile matter 86%; manufactured by Asahi Chemical Ind. Co., Ltd.) and 57.8 g of Acrydic ®A-850 was diluted with said solvent and this solution was also sprayed. Properties of the coating are also shown in Table 1.

TABLE 1

| Isocyanate Component | Reference Example 1 | Duranate N |
|---|---|---|
| Dry hard time (minute) | 190 | 330 |
| Pencil scratch test | F | HB |
| Erichsen test (mm) | >8 | >8 |
| Cross hatch adhesion | 100/100 | 100/100 |
| Impact test (½ inch, g × cm) | 1000 × 50 | 1000 × 50 |
| Mandrel bending test (mm) | 2 | 2 |
| Solvent resistance (rubbing with ethyl-acetate) | good | poor |

EXAMPLE 2

20 g of the isocyanate component obtained in Reference Example 2 was dissolved in 20 g of butyl acetate and the mixture was mixed with 52.7 g of polyester-polyol Takelac ®U-25 (OH value 40; nonvolatile matter 75%; manufactured by Takeda Chemical Industries, Ltd.). The mixture was diluted with a mixed solvent of toluene, butyl acetate and cellosolve acetate. To this mixture were added a toluene solution of 300 mg of N,N,N'-trimethyl-N'-(hydroxyethyl)ethylenediamine and a toluene solution of 3 mg of dibutyltin dilaurate, followed by mixing. Then, the solution was sprayed on a cold-rolled steel panel to form a coating of about 50μ thick. Properties of the coating after this was allowed to stand at room temperature for 7 days are shown in Table 2. As comparative example, a mixture of 30 g Takenate ® D-120N (trimethylolpropane adduct of 1,3-bis(isocyanatomethyl)cyclohexane, amine equivalent 387; nonvolatile matter 75%; manufactured by Takeda Chemical Industries, Ltd.) and 31.1 g of Takelac ®U-25 was diluted and coated to form a coating. Properties of this coating are also shown in Table 2.

TABLE 2

| Isocyanate Component | Reference Example 2 | Takenate D-120N |
|---|---|---|
| Pot life (hour) | 42 | 60 |
| Dry hard time (minute) | 210 | 300 |
| Pencil scratch test | 2H | H |
| Erichsen test (mm) | 8 | 6 |
| Cross hatch adhesion | 100/100 | 100/100 |
| Impact test (½ inch, g × cm) | 500 × 50 | 500 × 20 |
| Mandrel bending test (mm) | 6 | 10 |
| Solvent resistance (rubbing with ethyl-acetate) | good | fair |

EXAMPLE 3

5.5 g of the polyisocyanate solution obtained in Reference Example 3 was mixed with 50 g of an acrylic polyol (prepared from styrene, methylmethacrylate, hydroxyethylacrylate, ethyl acrylate and butyl acrylate; average molecular weight about 13,000; OH value 30; nonvolatile matter 50%). The mixture to which the catalysts indicated in Table 3 were respectively added was coated on a glass plate. Each of thus coated samples which were allowed to stand at room temperature for 3 days was subjected to solvent resistance test (rubbing with ethyl acetate). Separately, the same mixture was coated on a release paper to make a film, which was prepared by using the same conditions as mentioned above. Residual NCO group (2250 cm$^{-1}$) and oxadiazinetrione group (1825 cm$^{-1}$) were measured with IR spectrum of the films. As comparative examples, the coating and the film obtained from 10.3 g of Takenate ®D-120N and 50 g of the same acrylic polyol as used hereinabove in the same manner as mentioned above were subjected to the same tests. The results are also shown in Table 3.

TABLE 3

| | | Curing Agents | | | | | | |
|---|---|---|---|---|---|---|---|---|
| | | Polyisocyanate of Reference Example 3 | | | | | | Takenate ® D-120N |
| | | Catalysts* (mg) | | | | | | |
| Curing conditions | | DBTL 2 DBU 10 | DBTL 2 Quinu-clidine 15 | DBTL 15 TMHEDA 30 | DBTL 2 TBP 100 | TMHEDA 50 | DBTL 2 | — |
| Room temperature × 3 days | Convertion of isocyanate (%) | 65 | 59 | 74 | 66 | 60 | 52 | 45 |
| | Conversion of oxadiazine-trione (%) | 71 | 82 | 80 | 63 | 83 | 3 | — |
| | Solvent resistance | good | good | good | good | good | poor | fair |

*DBTL: Dibutyltin dilaurate
DBU: 1,5-diazabicyclo[5,4,0]-5-undecene
TMHEDA: N,N,N'—trimethyl-N'—(hydroxyethyl)ethylenediamine
TBP: Tributylphosphine

EXAMPLE 4

10 g of the isocyanate component obtained in Reference Example 1 was mixed with 200 g of polyester polyol Takelac ®A-606 (OH value 13.2; nonvolatile matter 60%; manufactured by Takeda Chemical Industries, Ltd.) and then the mixture was diluted with 300 g of ethyl acetate. Thereto was added 0.13 g of 1,5-diazabicyclo[5,4,0]-5-undecene, followed by mixing. The mixture was coated on a nylon film and dried and a polypropylene film was laminated thereon. Coating amount was 3.5 g/m². This laminate film was allowed to stand at 40° C. for 3 days and thereafter adhesive strength thereof was measured to obtain 1000 g/15 mm.

EXAMPLE 5

268 g of trimethylolpropane, 134 g of dipropylene glycol, 292 g of adipic acid and 200 g of coconut oil fatty acid were mixed. While nitrogen gas was being bubbled, the mixture was heated at 210° to 220° C. for 10 hours with distilling off the produced water to prepare a polyester polyol having an acid value of 3.5, a hydroxyl value of 215 and a viscosity of 3050 cps. 260 g of this polyester polyol was mixed with 132.5 g of the isocyanate component of Reference Example 1. To the mixture were added 1.3 g of tributylphosphine and 0.04 g of dibutyltin dilaurate, followed by mixing. Then, the mixture was coated on a cold-rolled steel panel by a bar-coater to form a coating of about 50μ thick. Properties of the coating after being allowed to stand at room temperature for 7 days are as follows:

| | |
|---|---|
| Dry hard time (minute) | 340 |
| Pencil scratch test | F |
| Erichsen test (mm) | 8 |
| Cross hatch adhesion | 100/100 |
| Impact test (½ inch, g × cm) | 1000 × 50 |
| Mandrel bending test (mm) | 2 |
| Solvent resistance (rubbing with ethylacetate) | good |

EXAMPLE 6

106 g of polyether polyol (prepared by addition of propylene oxide to glycerine; OH value 530; viscosity 600 cps) was mixed with 151 g of the isocyanate component obtained in Reference Example 2. To the mixture were added 1.28 g of N,N,N'-trimethyl-N'-(hydroxyethyl)ethylenediamine and 0.013 g of tetrabutyl-1,3-diacetoxydistannoxane, followed by mixing. Then, the mixture was coated on a cold-rolled steel panel by a bar-coater to form a coating of about 50μ thick. Properties of this coating after being allowed to stand at room temperature for 7 days are as follows:

| | |
|---|---|
| Dry hard time (minute) | 600 |
| Pencil scratch rest | H |
| Erichsen test (mm) | 8 |
| Cross hatch adhesion | 100/100 |
| Impact test (½ inch, g × cm) | 500 × 50 |
| Mandrel bending test (mm) | 2 |
| Solvent resistance (rubbing with ethylacetate) | good |

EXAMPLE 7

A mixture of 90 g of polyester glycol [molecular weight 1,500; prepared from isophthalic acid/adipic acid=1/1 (molar ratio) and diethylene glycol] and 10 g of diethylene glycol was mixed with 66 g of the isocyanate component obtained in Reference Example 1 at 40° C. Then, 0.16 g of 1,5-azabicyclo[5,4,0]-5-undecene was added thereto to prepare an adhesive composition 1, which had a viscosity of 3,000 cps at 40° C.

Immediately, at 40° C. the composition 1 was coated on a polyester film (PET thickness 12μ) at a coating amount of 1.5 g/m² and an aluminum foil (Al thickness 9μ) was laminated thereon by a solventless type laminator. Then, the composition 1 was further coated on the aluminum surface at a coating amount of 1.5 g/m² and a cast polypropylene film (CPP; thickness 60μ; the surface was corona discharge treated) was laminated thereon to form three layers, which were cured at 40° C. for 3 days. Adhesive strength between Al/CPP was measured to indicate 980 g/15 mm (pulling rate 300 mm/min, T-peel). Furthermore, a bag was made from this laminate film with the propylene film being inner face and meat sauce (manufactured by Nisshin Flour Milling Co., Ltd.) was packed in this bag. This sample was sterilized with hot water at 120° C. under a pressure of 2 kg/cm² for 30 minutes and thereafter the state of adhesion and adhesive strength between Al/CPP were examined.

| | |
|---|---|
| Adhesive strength (g/15 mm) | 920 |
| State of adhesion | No change |

EXAMPLE 8

100 g of polyester glycol [molecular weight 600; prepared from isophthalic acid/adipic acid=3/1 (molar ratio) and ethylene glycol/neopentyl glycol=⅔ (molar ratio)] and 20 g of Epikote ®1002 (epoxy resin manufactured by Shell Chemical Co., Ltd.) were mixed well at 90° C. After cooling to 60° C., 60 g of the isocyanate component obtained in Reference Example 1 was mixed therewith and then 0.4 g of potassium 2-ethylhexanoate was added and mixed to obtain adhesive composition 2, which had a viscosity of 2,300 cps at 60° C.

Example 7 was repeated except that the lamination was carried out at 60° C. with the use of adhesive composition 2. Adhesion test between Al/CPP was conducted.

| | |
|---|---|
| Adhesive strength before sterilization (g/15 mm) | 1200 |
| Adhesive strength after sterilization (g/15 mm) | 1250 |
| State of adhesion after sterilization | No change |

EXAMPLE 9

18.8 g of xylylene diisocyanate, 100 g of polyoxypropylene glycol (molecular weight 1000) and 13.4 g of dipropylene glycol were reacted at 80° C. for 4 hours to prepare polyurethane polyol. The reaction mixture was cooled to 60° C. and 0.4 g of 40% methanol solution of trimethylbenzyl ammonium hydroxide was added thereto. Then, 66.1 g of the isocyanate component obtained in Reference Example 2 was mixed therewith to obtain an adhesive composition, which had a viscosity of 5,000 cps at 60° C.

The subsequent procedure of Example 7 was repeated except that the lamination was effected with the use of this composition at 60° C. and adhesion test between Al/CPP was conducted.

| | |
|---|---|
| Adhesive strength before sterilization (g/15 mm) | 800 |
| Adhesive strength after sterilization (g/15 mm) | 750 |
| State of adhesion after sterilization | No change |

COMPARATIVE EXAMPLE 1

Example 7 was repeated except that the lamination was effected at 80° C. with the use of solventless type adhesive Takenate ®A-259 (polyether polyurethane polyisocyanate adhesive having a viscosity of 2,000 cps at 80° C.; manufactured by Takeda Chemical Industries, Ltd.) and adhesion test between Al/CPP was conducted.

| | |
|---|---|
| Adhesive strength before sterilization (g/15 mm) | 300 |
| Adhesive strength after sterilization (g/15 mm) | 200 |
| State of adhesion after sterilization | Partially delaminated |

COMPARATIVE EXAMPLE 2

A mixture of 61.7 g of xylylenediisocyanate and 98.3 g of the polyester glycol (molecular weight 600) used in Example 8 was reacted at 80° C. for 4 hours to obtain a polyurethane product, which had a viscosity of 2,220 at 80° C. The subsequent procedure of Example 7 was repeated except that the lamination was effected at 80° C. with the use of said product and adhesion test between Al/CPP was conducted.

| | |
|---|---|
| Adhesive strength before sterilization (g/15 mm) | 750 |
| Adhesive strength after sterilization (g/15 mm) | 400 |
| State of adhesion after sterilization | Partially delaminated |

EXAMPLE 10

50 g of acrylic polyol (prepared from styrene, methyl methacrylate, hydroxyethyl acrylate, ethyl acrylate and butyl acrylate; average molecular weight 12,000; OH value 40; nonvolatile matter 50%) was mixed with 6.0 g of the isocyanate component obtained in Reference Example 2 which was diluted with 100 g of a mixed solvent of toluene, butyl acetate and 2-ethoxyethyl acetate. Thereto was added 0.3 g of a 5% ethanol solution of sodium hydroxide and the resultant mixture was sprayed on a cold-rolled steel panel to form a coating of about 50μ thick. This coated sample was allowed to stand at room temperature (10° to 25° C.) for 7 days. Properties of the coating are as follows:

| | |
|---|---|
| Dry hard time (minute) | 160 |
| Pencil scratch test | F-H |
| Erichsen test (mm) | 8 |
| Cross hatch adhesion | 100/100 |
| Impact test (½ inch, g × cm) | 1000 × 50 |
| Mandrel bending test (mm) | 2 |
| Solvent resistance (rubbing with ethylacetate) | Good |

EXAMPLE 11

100 g of polyester polyol Takelac ®A-606 (OH value 13.2; nonvolatile matter 60%; manufactured by Takeda Chemical Industries, Ltd.) and 5 g of the isocyanate component obtained in Reference Example 1 were mixed and the mixture was diluted with 150 g of ethyl acetate. Thereto was added 10 g of 1% methanol solution of potassium cyanate and, after drying, the mixture was coated on a nylon film and a polypropylene film was laminated thereon. Coating amount was 3.5 g/m². This laminate film was allowed to stand at 20° C. for 7 days and then adhesive strength was measured to indicate 850 g/15 mm.

EXAMPLE 12

150 g of polypropylene glycol (OH value 56.1), 5.1 g of trimethylolpropane and 1 g of potassium 2-ethylhexanoate were homogeneously mixed to prepare an active hydrogen component, with which 39.2 g of the isocyanate component obtained in Reference Example 1 was mixed. The mixture was spread on a glass plate treated with releasing agent and was allowed to stand at 25° C. After 24 hours, there was obtained an elastomer, which could be released from the glass plate. The cured sample which was further allowed to stand at 25° C. for 5 days had the following properties.

| | |
|---|---|
| Hardness (JIS A) | 56° |
| Tensile strength(kg/cm²) | 28 |
| Elongation (%) | 310 |

EXAMPLE 13

1551 g of poly(butylene adipate)diol (OH value 108.5), 135 g of 1,4-butanediol and 167 g of isophorone diisocyanate were reacted at 80° C. for 2 hours in the presence of 0.3 g of dibutyltin dilaurate, then 1853 g of methylethyl ketone was added thereto and the reaction was further carried out at 70° C. for 6 hours to prepare polyester polyol having urethane bond, which had an OH value of 18 and a viscosity of 2,210 cps at 25° C. 100 g of thus obtained polyester polyol having urethane bond, 150 g of butyl acetate, 0.5 g of tributylphosphine and 28 g of the isocyanate component obtained in Reference Example 1 were mixed and the mixture was sprayed on a flexible polyvinyl chloride-coated fabric and dried at 40° C. for 5 hours to obtain a film of 30μ. As a comparative example, 100 g of said polyester polyol having urethane bond, 150 g of butyl acetate and 35 g of Duranate ®N (biuret derivative of hexamethylene diisocyanate; amine equivalent 208; nonvolatile matter 86%; manufactured by Asahi Chemical Ind. Co. Ltd.) were mixed and the mixture was sprayed on a flexible polyvinyl chloride-coated fabric and dried at 40° C. for 5 hours to obtain a film of 30μ thick. The cured films had the following properties.

| Isocyanate Component | Reference Example 1 | Duranate ® N |
|---|---|---|
| Trichloroethylene rubbing test | good | poor |
| Flexibility (number of cycles) (Balley Flex-O-Meter) | >20,000 | <18,000 |
| Adhesion (cross cut test) | good | good |

EXAMPLE 14

150 g of polyoxyethylenepropylene glycol (OH value 56.0; propylene oxide/ethylene oxide=90/10 by weight), 100 g of calcium carbonate, 8 g of colloidal silica, 20 g of titanium oxide, 0.05 g of carbon and 0.2 g of N,N,N'-trimethyl-N-(hydroxyethyl)ethylenediamine were kneaded with a mixing roller to prepare a grey pasty polyol compound. 100 g of this polyol compound and 6.0 g of the isocyanate component obtained in Reference Example 2 were mixed and the mixture were filled in a concrete joint of 2.0 cm wide and 1.0 cm deep. After 3 days at room temperature, the mixture gave an elastomer of a hardness 20° (JIS A). Good bonding for concretes was attained and thus the mixture showed as excellent sealing properties. As a comparative example, 100 g of said polyol compound was mixed with 13.5 g of Takenate ®D-120N [trimethylolpropane adduct of 1,3-bis(isocyanatomethyl)cyclohexane; amine equivalent 337; nonvolatile matter 75%, manufactured by Takeda Chemical Industries, Ltd.)] and the mixture was filled in a joint of concretes, but it did not cure even after 5 days.

EXAMPLE 15

100 g of polyoxypropylene glycol (OH value 112) and 12.5 g of methylene bis(orthochloroaniline) were mixed at 90° C. for one hour to obtain a homogeneous solution. This solution was mixed with 0.5 g of 1,5-diazabicyclo-[5,4,0]-5-undecene at room temperature and further with 31 g of the isocyanate component obtained in Reference Example 2. The mixture was injected into an aluminum mold at 35° C. After one hour, there was obtained an urethane elastomer foam having a specific gravity of 0.85.

EXAMPLE 16

43 kg of poly(oxyethylenepropylene)triol (propylene oxide/ethylene oxide=80/20 by weight; OH value 33.5), 6.0 kg of ethylene glycol and 0.43 kg of 1,5-diazabicyclo[5,4,0]-5-undecene were mixed to prepare an active hydrogen component. This mixture was charged into a tank of a reaction injection molding machine and the temperature was adjusted to 40° C. 40 kg of the isocyanate component of Reference Example 1 was charged in another tank of the molding machine and the temperature was adjusted to 40° C. The molding machine was adjusted so that mixing ratio of the active hydrogen component and the isocyanate component was 100:35 (by weight) and the resultant mixture was injected into an aluminum mold (cavity 3×300×1000 mm) kept at 40° C. After 3 minutes, the mixture was cured and was able to be demolded. Thus molded elastomer had a hardness of 95° (JIS A) and a specific gravity of 0.95.

We claim:

1. A polyurethane composition kit, curable at ambient temperature, which comprises an isocyanate component having oxadiazinetrione ring, an active hydrogen component containing at least two active hydrogens and having a molecular weight of 400 to 100,000 and a Lewis base whose basic site has no hydrogen active to NCO group, the proportion of the isocyanate component to the active hydrogen component being such that the ratio of the total number of isocyanate group and oxadiazinetrione ring to the number of active hydrogen is in a range of 0.1 to 10, the amount of said Lewis base being in a range of about 0.001 to 10% by weight based on the weight of non-volatile matter in said isocyanate component and said active hydrogen component; said isocyanate component and said active hydrogen component being separated from each other until actual use whereupon all components are admixed to form a polyurethane resin at ambient temperature.

2. A polyurethane composition kit according to claim 1, wherein the Lewis base whose basic site has no hydrogen active to NCO group is (a) a tertiary amine, (b) a tertiary phosphine or (c) a weak acid salt, hydroxide or alcoholate of a quaternary ammonium, an alkali metal or an alkaline earth metal.

3. A polyurethane composition kit according to claim 1, wherein the isocyanate component having oxadiazinetrione ring is the one prepared by the reaction of an isocyanate compound with carbon dioxide.

4. A polyurethane composition kit according to claim 3, wherein the isocyanate compound is derived from an aliphatic, alicyclic or aromatic-aliphatic polyisocyanate.

5. A polyurethane composition kit according to claim 4, wherein the aliphatic polyisocyanate is hexamethylene diisocyanate.

6. A polyurethane composition kit according to claim 4, wherein the alicyclic polyisocyanate is bis-(isocyanatomethyl)cyclohexane.

7. A polyurethane composition kit according to claim 1, wherein the isocyanate component is one having an average functionality of 2 to 10, which is the sum of oxidiazinetrione ring and isocyanate group in one molecule.

8. A polyurethane composition kit according to claim 1, wherein the active hydrogen component is a polyol containing 2 to 50 hydroxyl groups in one molecule and having a molecular weight of 400 to 50,000.

9. A polyurethane composition kit according to claim 8, wherein the polyol is polyester polyol, polyether polyol, polyether-ester polyol, polyester-amide polyol, acrylic polyol, polyurethane polyol, epoxy-modified polyol, polyhydroxyalkane, oil-modified polyol, castor oil or a mixture thereof.

10. A polyurethane composition kit according to claim 2, wherein the tertiary amine is an aliphatic tertiary amine.

11. A polyurethane composition kit according to claim 10, wherein the aliphatic tertiary amine is that represented by the following formula:

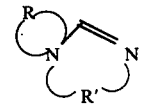

wherein R and R' represent alkylene of 2 to 6 carbon atoms.

12. A polyurethane composition kit according to claim 10, wherein the aliphatic tertiary amine is that represented by the following formula:

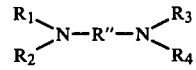

wherein $R_1$-$R_4$ each represents an alkyl having 1 to 6 carbon atoms and R" represents an alkylene having 1 to 8 carbon atoms or —R'''—NH$_5$—R'''— (wherein R''' represents an alkylene having 1 to 8 carbon atoms and $R_5$ is the same as $R_1$-$R_4$), and $R_1$ and $R_2$ or $R_3$ and $R_4$, when taken together, may form an alkylene having 1 to 8 carbon atoms, —R'''—O—R'''— (R'''' is the same as defined before) or —R'''—NH$_6$—R'''— (R'''' is the same as defined before and $R_6$ is the same as $R_1$-$R_4$), at least one of $R_1$-$R_6$ being substituted by hydroxyl or an alkoxy having 1 to 6 carbon atoms.

13. A polyurethane composition kit according to claim 10, wherein the aliphatic tertiary amine is that represented by the following formula:

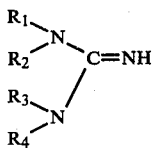

wherein $R_1$–$R_4$ each represents an alkyl having 1 to 6 carbon atoms which may be substituted with hydroxyl or an alkoxy having 1 to 6 carbon atoms, and $R_1$ and $R_2$ or $R_3$ and $R_4$, when taken together, may form an alkylene having 1 to 8 carbon atoms.

14. A polyurethane composition kit according to claim 2, wherein the tertiary phosphine is an aromatic or aliphatic tertiary phosphine.

15. A polyurethane composition kit according to claim 2, wherein the weak acid salt of a quaternary ammonium is a salt of ammonium having aliphatic or aromatic substituent with an acid having a pKa of more than 3 in water.

16. A polyurethane composition kit according to claim 2, wherein the hydroxide of quaternary ammonium is a quaternary ammonium hydroxide having aliphatic or aromatic substituent.

17. A polyurethane composition kit according to claim 2, wherein the weak acid salt of an alkali metal or an alkaline earth metal is an alkali metal salt or an alkaline earth metal salt of an acid having a pKa of more than 3 in water.

18. A process for producing polyurethane resin which comprises reacting an isocyanate component having oxadiazinetrione ring with an active hydrogen component containing at least two active hydrogens and having a molecular weight of 400 to 100,000 at ambient temperature in the presence of a Lewis base whose basic site has no hydrogen active to NCO group, the proportion of the isocyanate component to the active hydrogen component being such that the ratio of the total number of isocyanate group and oxadiazinetrione ring to the number of active hydrogen is in a range of 0.1 to 10, an amount of the Lewis base being in a range of about 0.001 to 10% by weight based on the weight of nonvolatile matter in said active hydrogen component and said isocyanate component.

19. A process according to claim 18, wherein the Lewis base whose basic site has no hydrogen active to NCO group is (a) a tertiary amine, (b) a tertiary phoshine, or (c) a weak acid salt, hydroxide or alcoholate of a quaternary ammonium, an alkali metal or an alkaline earth metal.

20. A process according to claim 18, wherein the ratio of the total number of isocyanate group and oxadiazinetrione ring to the number of active hydrogen in the active hydrogen component is in a range of 0.5 to 3 and the amount of the Lewis base is in a range of 0.003 to 5% by weight based on the weight of nonvolatile matter in said active hydrogen component and said isocyanate component.

21. A process according to claim 18, wherein the isocyanate component having oxadiazinetrione ring is the one prepared by the reaction of an isocyanate compound with carbon dioxide.

22. A process according to claim 18, wherein the isocyanate compound is derived from an aliphatic, alicyclic or aromatic-aliphatic polyisocyanate.

23. A process according to claim 18, wherein the aliphatic polyisocyanate is hexamethylene diisocyanate.

24. A process according to claim 18, wherein the alicyclic polyisocyanate is bis(isocyanatomethyl)cyclohexane.

25. A process according to claim 18, wherein the isocyanate component is one having an average functionality of 2 to 10, which is the sum of oxadiazinetrione ring and isocyanate group in one molecule.

26. A process according to claim 18, wherein the active hydrogen component is a polyol containing 2 to 50 hydroxyl groups in one molecule and having a molecular weight of 400 to 50,000.

27. A process according to claim 18, wherein the polyol is polyester polyol, polyether polyol, polyether-ester polyol, polyesteramide polyol, acrylic polyol, polyurethane polyol, epoxy-modified polyol, polyhydroxyalkane, oil-modified polyol, castor oil or a mixture thereof.

28. A process according to claim 19, wherein the tertiary amine is an aliphatic tertiary amine.

29. A process according to claim 28, wherein the aliphatic tertiary amine is that represented by the following formula:

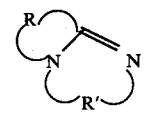

wherein R and R' represent alkylene of 2 to 6 carbon atoms.

30. A process according to claim 28, wherein the aliphatic tertiary amine is that represented by the following formula:

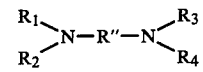

wherein $R_1$–$R_4$ each represents an alkyl having 1 to 6 carbon atoms and R'' represents an alkylene having 1 to 8 carbon atoms or —R'''—$NR_5$—R'''— (wherein R''' represents an alkylene having 1 to 8 carbon atoms and $R_5$ is the same as $R_1$–$R_4$), and $R_1$ and $R_2$ or $R_3$ and $R_4$, when taken together, may form an alkylene having 1 to 8 carbon atoms, —R'''—O—R'''— (R''' is the same as defined before) or —R'''—$NR_6$—R'''— (R''' is the same as defined before and $R_6$ is the same as $R_1$–$R_4$), at least one of $R_1$–$R_6$ being substituted by hydroxyl or an alkoxy having 1 to 6 carbon atoms.

31. A process according to claim 28, wherein the aliphatic tertiary amine is that represented by the following formula:

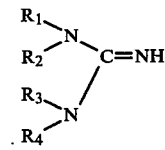

wherein $R_1$–$R_4$ each represents an alkyl having 1 to 6 carbon atoms which may be substituted with hydroxyl or an alkoxy having 1 to 6 carbon atoms, and $R_1$ and $R_2$ or $R_3$ and $R_4$, when taken together, may form an alkylene having 1 to 8 carbon atoms.

32. A process according to claim 19, wherein the tertiary phosphine is an aromatic or aliphatic tertiary phosphine.

33. A process according to claim 19, wherein the weak acid salt of a quaternary ammonium is a salt of a ammonium having aliphatic or aromatic substituent with an acid having a pKa of more than 3 in water.

34. A process according to claim 19, wherein the hydroxide of quaternary ammonium is a quaternary ammonium hydroxide having aliphatic or aromatic substituent.

35. A process according to claim 19, wherein the weak acid salt of an alkali metal or an alkaline earth metal is an alkali metal salt or an alkaline earth metal salt of an acid having a pKa of more than 3 in water.

36. A process for producing polyurethane resin which comprises reacting an isocyanate component having oxadiazinetrione ring with an active hydrogen component containing at least two active hydrogens and having a molecular weight of 400 to 100,000 at ambient temperature in the presence of a tertiary phosphine, the proportion of the isocyanate component to the active hydrogen component being such that the ratio of the total number of isocyanate group and oxadiazinetrione ring to the number of active hydrogen is in a range of 0.1 to 10, an amount of the tertiary phosphine being in a range of about 0.001 to 10% by weight based on the weight of nonvolatile matter in said active hydrogen component and said isocyanate component.

37. A process according to claim 36, wherein the tertiary phosphine is an aromatic or aliphatic tertiary phosphine.

38. A process according to claim 37, wherein the aliphatic tertiary phosphine is tri-n-butylphosphine.

39. A process according to claim 36, wherein the ratio of the total number of isocyanate group and oxadiazinetrione ring to the number of active hydrogen in the active hydrogen component is in a range of 0.5 to 3 and the amount of the tertiary phosphine is in a range of 0.003 to 5% by weight based on the weight of nonvolatile matter in said active hydrogen component and said isocyanate component.

40. A process for producing polyurethane resin which comprises reacting an isocyanate component having oxadiazinetrione ring with an active hydrogen component containing at least two active hydrogens and having a molecular weight of 400 to 100,000 at ambient temperature in the presence of a weak acid salt or hydroxide of a quaternary ammonium, the proportion of the isocyanate component to the active hydrogen component being such that the ratio of the total number of isocyanate group and oxadiazinetrione ring to the number of active hydrogen is in a range of 0.1 to 10, an amount of the weak acid salt or hydroxide of a quaternary ammonium being in a range of about 0.001 to 10% by weight based on the weight of nonvolatile matter in said active hydrogen component and said isocyanate component.

41. A process according to claim 40, wherein the hydroxide of a quaternary ammonium is trimethylbenzyl ammonium hydroxide.

42. A process according to claim 40, wherein the ratio of the total number of isocyanate group and oxadiazinetrione ring to the number of active hydrogen in the active hydrogen component is in a range of 0.5 to 3 and the amount of the hydroxide of a quaternary ammonium is in a range of 0.003 to 5% by weight based on the weight of nonvolatile matter in said active hydrogen component and said isocyanate component.

43. A process for producing polyurethane resin which comprises reacting an isocyanate component having oxadiazinetrione ring with an active hydrogen component containing at least two active hydrogens and having a molecular weight of 400 to 100,000 at ambient temperature in the presence of a hydroxide of an alkali metal or an alkaline earth metal, the proportion of the isocyanate component to the active hydrogen component being such that the ratio of the total number of isocyanate group and oxadiazinetrione ring to the number of active hydrogen is in a range of 0.1, to 10, and amount of the hydroxide of an alkali metal or an alkaline earth metal being in a range of about 0.001 to 10% by weight based on the weight of nonvolatile matter in said active hydrogen component and said isocyanate component.

44. A process according to claim 43, wherein the hydroxide of an alkali metal is sodium hydroxide.

45. A process according to claim 43, wherein the ratio of the total number of isocyanate group and oxadiazinetrione ring to the number of active hydrogen in the active hydrogen component is in a range of 0.5 to 3 and the amount of the hydroxide of an alkali metal or alkaline earth metal is in a range of 0.003 to 5% by weight based on the weight of nonvolatile matter in said active hydrogen component and said isocyanate component.

* * * * *